United States Patent
Zinner et al.

(10) Patent No.: US 10,846,545 B2
(45) Date of Patent: Nov. 24, 2020

(54) METHOD FOR VERIFYING THE CONTENT AND INSTALLATION SITE OF TRAFFIC SIGNS

(71) Applicant: Continental Automotive GmbH, Hannover (DE)

(72) Inventors: Helge Zinner, Regensburg (DE); Christoph Arndt, Loiching (DE)

(73) Assignee: Continental Automotive GmbH, Hannover (DE)

( * ) Notice: Subject to any disclaimer, the term of this patent is extended or adjusted under 35 U.S.C. 154(b) by 135 days.

(21) Appl. No.: 16/302,433

(22) PCT Filed: May 18, 2017

(86) PCT No.: PCT/EP2017/061903
§ 371 (c)(1),
(2) Date: Nov. 16, 2018

(87) PCT Pub. No.: WO2017/198743
PCT Pub. Date: Nov. 23, 2017

(65) Prior Publication Data
US 2019/0279007 A1 Sep. 12, 2019

(30) Foreign Application Priority Data
May 19, 2016 (DE) .......... 10 2016 208 621

(51) Int. Cl.
*G06K 9/00* (2006.01)
*G06K 9/62* (2006.01)
(Continued)

(52) U.S. Cl.
CPC ....... *G06K 9/00818* (2013.01); *G06K 9/6215* (2013.01); *G08G 1/09623* (2013.01); *G08G 1/096783* (2013.01)

(58) Field of Classification Search
CPC ............ G06K 9/00818; G06K 9/6215; G08G 1/09623; G08G 1/096783
See application file for complete search history.

(56) References Cited

U.S. PATENT DOCUMENTS 6,560,529 B1 * 5/2003 Janssen .................... G06K 9/72
701/469
8,078,349 B1   12/2011 Prada Gomez et al.
(Continued)

FOREIGN PATENT DOCUMENTS

DE    19938267 A1 *  2/2001   ....... G08G 1/096783
DE    19938267 A1     2/2001
(Continued)

OTHER PUBLICATIONS

International Search Report and Written Opinion dated Jul. 31, 2017 from corresponding International Patent Application No. PCT/EP2017/061903.
(Continued)

*Primary Examiner* — Nizar N Sivji

(57) ABSTRACT

The content and installation site of road signs are verified by detecting a road sign in one or more images from at least one camera. Image analysis is used to determine the content of the road sign portrayed in the image that is visually recognisable for a human being. Moreover, the installation site of the road sign is determined, and data that are not interpretable for a human being are obtained that are provided by the road sign and that represent the content and the installation site of the road sign. If the determined data and the data obtained from the road sign are concordant then the content of the road sign is displayed or announced to a driver of the vehicle for information. If there is no concordance then a further automatic plausibility check can be performed or a question or information can be sent to the driver.

8 Claims, 8 Drawing Sheets

(51) Int. Cl.
*G08G 1/0962* (2006.01)
*G08G 1/0967* (2006.01)

(56) References Cited

U.S. PATENT DOCUMENTS

| | | | |
|---|---|---|---|
| 8,576,091 | B2 | 11/2013 | Boss et al. |
| 10,414,347 | B2 * | 9/2019 | Wilbert ............... B60R 11/04 |
| 10,515,547 | B2 * | 12/2019 | Koyama ............... B60R 1/00 |
| 2005/0143916 | A1 | 6/2005 | Kim et al. |
| 2008/0273757 | A1 | 11/2008 | Nakamura et al. |
| 2011/0221612 | A1 | 9/2011 | Fuse |
| 2012/0046855 | A1 * | 2/2012 | Wey ............... G08G 1/09623 701/117 |
| 2015/0302747 | A1 * | 10/2015 | Ro ............... G08G 1/0967 340/905 |
| 2017/0046580 | A1 * | 2/2017 | Lu ............... G06T 7/74 |

FOREIGN PATENT DOCUMENTS

| | | | | |
|---|---|---|---|---|
| DE | 102008043743 A1 * | 5/2010 | ........... | G08G 1/0962 |
| DE | 102008043743 A1 | 5/2010 | | |
| DE | 102012219106 A1 * | 5/2013 | ............. | G09F 13/16 |
| DE | 102012219106 A1 | 5/2013 | | |
| DE | 102012220357 A1 * | 6/2014 | ....... | G08G 1/096741 |
| DE | 102013011969 A1 | 1/2015 | | |
| DE | 102013221007 A1 | 4/2015 | | |
| DE | 102013224824 A1 | 6/2015 | | |
| GB | 2469738 A | 10/2010 | | |
| JP | 2006031072 A | 2/2006 | | |
| JP | 2008241507 A | 10/2008 | | |
| JP | 2012068694 A | 4/2012 | | |
| WO | 2015/172770 A1 | 11/2015 | | |

OTHER PUBLICATIONS

Office Action dated Mar. 8, 2017 for corresponding German Patent Application No. 10 2016 208 621.9.

* cited by examiner

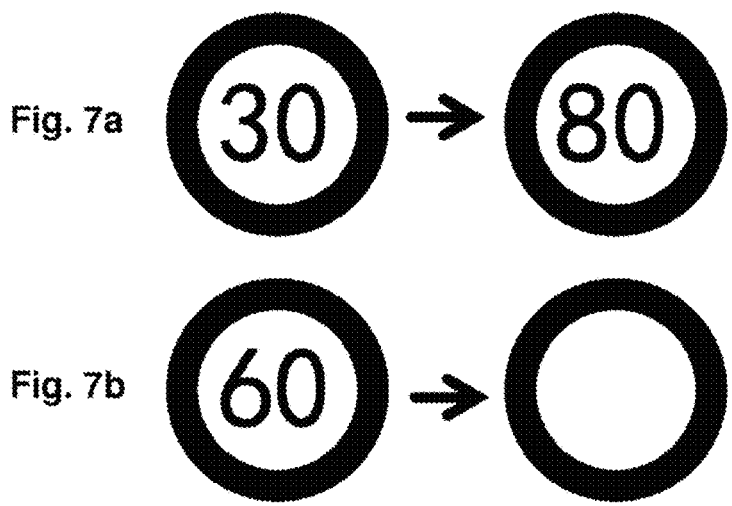
Fig. 7a
Fig. 7b
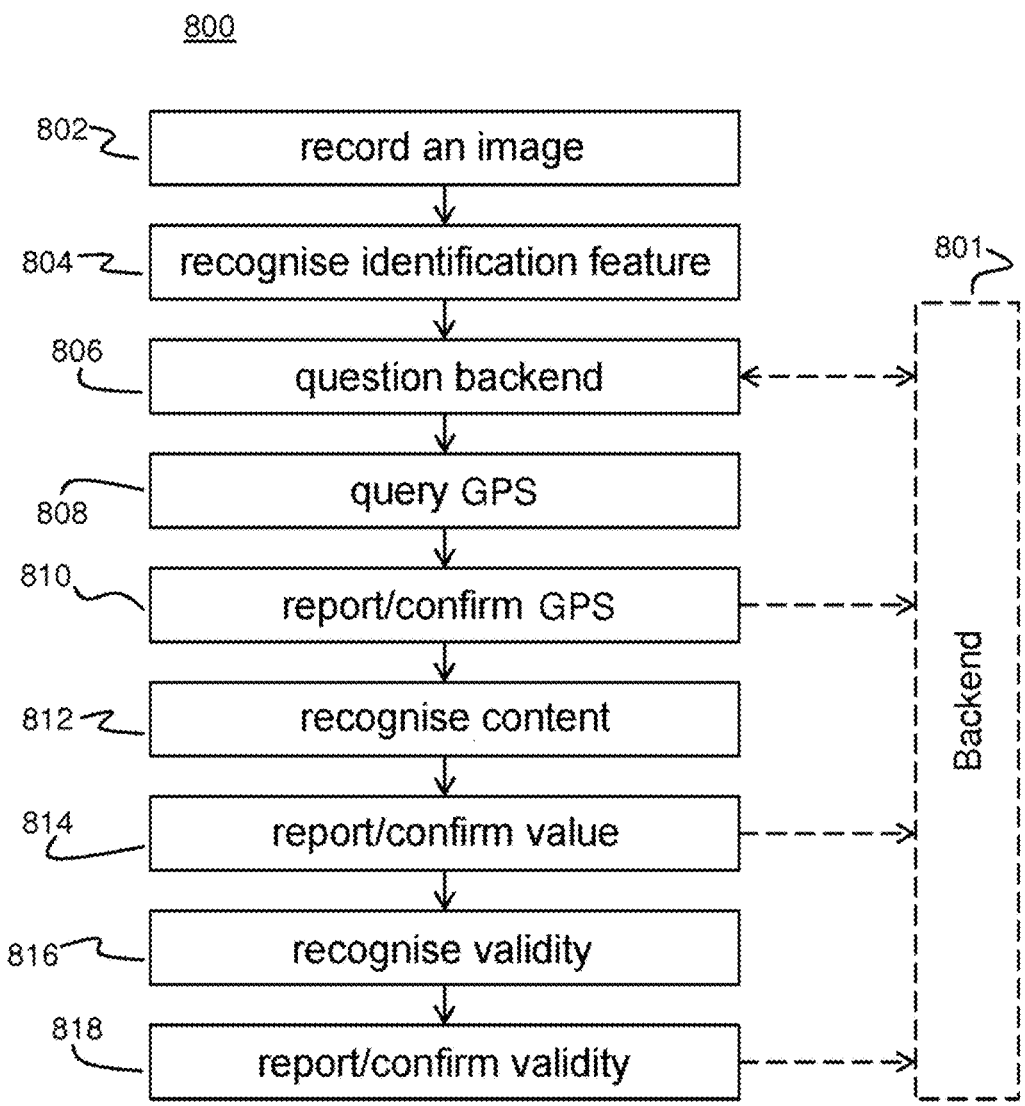
Fig. 8

METHOD FOR VERIFYING THE CONTENT AND INSTALLATION SITE OF TRAFFIC SIGNS

BACKGROUND

Technical Field

The present invention relates to the verification of at least the content and the installation site of road signs.

Prior Art

Apparatuses for recognising road signs have been provided in many motor vehicles for some time, for example in order to draw a driver's attention to a speed limit applicable in a town and/or on a day and/or at a time of day or to an overtaking restriction. Frequently, a recognised road sign is displayed to the driver on a display in the instrument cluster, or on a display of a navigation system. The driver is therefore able at all times to check what restriction on the traffic is currently valid, even if he has not himself seen the road sign, e.g. on account of a distraction.

Road sign recognition is usually effected by means of a camera, the images from which are supplied to an object detection algorithm. The object detection algorithm detects, for example on the basis of basic patterns stored in a database arranged in the vehicle, candidate objects, that is to say objects that could represent a road sign, and compares these candidate objects with recognition features or representative images of road signs that are stored in a database. When a concordance has been found, the road sign can be displayed.

Some apparatuses for road sign recognition also perform a check for road signs having conditional applicability, which are denoted by additional signs. By way of example, traffic restrictions that apply only at certain times of day can be matched against the present time of day, or road signs that apply only to certain kinds of vehicle can be ignored if the vehicle in which the apparatus for road sign recognition is installed belongs to a different type of vehicle, to which the traffic restriction does not apply.

Road sign recognition is also important for autonomously or automatically driving vehicles, for example in order to be able to adapt the speed and the direction of travel to the respective situation. To this end, in addition to the comparison images or other data required for recognition, the database stores information about permissible or necessary actions for vehicle control, for example an applicable change of direction of travel or a preset value for a maximum permissible speed, which is forwarded to an apparatus for vehicle control.

Particularly in the case of automatically or autonomously driving vehicles, road sign recognition as provided for here opens up a way of influencing the driving of the vehicle externally without authorisation, because classification of road signs depending on the situation is not performed as a plausibility check. As such, by way of example, a road sign indicating a speed limit of 80 km/h that is installed in a 30 zone as a "dare" after having been stolen elsewhere cannot simply be recognised as wrong by the road sign recognition system and could lead to an automatically or autonomously driving vehicle travelling at excessive speed. Other manipulations of road signs have already occurred too. As such, road signs from self-proclaimed artists have been "embellished" by the addition of image elements such that although a human observer can still recognise the underlying road sign as such, possibly from the context of the installation site, a road sign recognition system is no longer able to recognise this "embellished" road sign as such. Examples of this are shown in FIGS. 1 and 2.

One solution to this problem is to match road signs and their installation sites recognised by a road sign recognition system against corresponding entries in a database. The installation site of a recognised road sign is determined by means of a navigation system of the vehicle in this case, e.g. by means of a satellite navigation system fitted in the vehicle. The database may be arranged in the vehicle, or a database arranged outside the vehicle is accessed via a wireless communication connection. A prerequisite for this is a database that is complete and always kept up to date. Updating databases arranged in individual vehicles is complex, however, and a prompt update cannot always be guaranteed. Similarly, it may be that a connection to a database arranged outside the vehicle might not be able to be set up at every location. Furthermore, a comprehensive prompt update is almost impossible in the case of only temporarily installed or mobile road signs, such as e.g. road signs installed at daytime road works or on slowly travelling road monitoring vehicles. Also in the case of road signs installed at locations at which accurate position finding by a navigation system cannot take place, e.g. in tunnels, the known method cannot always produce reliable and trustworthy results.

BRIEF SUMMARY

It is therefore an object of the present invention to specify a method and an apparatus that allow road signs to be checked for their content and their installation site. The content of a road sign in this context relates to the semantic content, that is to say the significance of a road sign for a driver of a vehicle or an autonomously or automatically driving vehicle.

For validation purposes, road signs are equipped with additional identification features that can automatically be checked electronically. The identification features comprise digitally coded information, for example. The digitally coded information can be provided by the road sign in fundamentally unencrypted fashion, but it is also possible for at least some of the digitally coded information to be provided in encrypted fashion, e.g. in order to hamper manipulations. The identification features can be provided in different ways, e.g. as additional optical features or as features wirelessly transmitted from the road sign to an applicable receiver. The validation or verification of the road sign is thus performed on the basis of features that are obtained via an independent route that goes beyond the mere visual recognition of the semantic content of the road sign in the camera image. The further features comprise, inter alia, information representing the site, the validity period, the orientation and the semantic content of the road sign.

A method according to the invention for verifying the content and installation site of road signs comprises detection of a road sign in one or more images from at least one camera. At least one image recorded by the camera in which a road sign has been recognised is used to determine, by means of image analysis, the content of the road sign portrayed in the image that is visually recognisable for a human being. The road sign can be detected, and the content of the road sign that is visually recognisable for a human being can be determined, in a conventional manner.

Moreover, the installation site of the road sign is determined, and data that are not immediately recognisable or interpretable for a human being are obtained that are provided by the road sign and that represent at least the content and the installation site of the road sign. The term "represent" in this context also covers an indirect representation, for example by data that allow obtainment of applicable information from a database. Finally, a comparison of the determined data and the obtained data is performed.

The installation site of the road sign can be determined by means of a navigation apparatus of a vehicle carrying out the method, for example, which navigation apparatus determines a respective present position of the vehicle continuously or at briefly successive intervals of time anyway. A navigation apparatus of this kind can comprise a satellite navigation apparatus and/or a dead-reckoning navigation apparatus, for example. The navigation apparatus may e.g. also be set up to ascertain a more accurate position by matching data representing the position on the earth's surface against a digital map and traffic routes contained therein. As soon as a road sign has been recognised, the known optical properties of the camera that has recorded the image of the road sign and the position of the vehicle at the time of the recording of the image of the road sign can be used to determine the position of the road sign.

According to one aspect of the method, the data provided by the road sign are obtained by means of at least one camera. The camera may in this context be the same camera as was used for recognising the road sign. The data that are not immediately recognisable or interpretable for a human being may be available in the form of a one-dimensional or two-dimensional binary code that is part of the road sign, for example. An example of a one-dimensional binary code is a barcode, and an example of a two-dimensional binary code is what is known as a quick response code (QR code). According to the present aspect of the invention, a barcode or QR code is mounted on the front of the road sign. The code contains information about the content and the installation site of the road sign, or an identification of the road sign and a reference to a database in which the applicable information for the road sign is stored in retrievable fashion. The code can also contain information about the lane on a multilane directional road for which the road sign is valid, the direction of travel for which it is valid, or which certification center has certified the road sign. The direction of travel in this context can be provided, by way of example, in the form of a compass bearing, that is to say as a number of degrees referenced to a northerly direction, or as an indication of a town situated in the direction of travel, e.g. "Frankfurt direction".

According to one aspect of the method, the data provided by the road sign are obtained by means of a light-sensitive sensor. The light-sensitive sensor in this context may be sensitive in a spectrum visible to human beings, but it is also possible for the light-sensitive sensor to be sensitive in a spectrum that is not visible to human beings, for example for light in the infrared spectrum. The road sign is equipped with an applicable light source transmitting coded data by means of suitable modulation of the light emitted by the light source, which light is received by the light-sensitive sensor and demodulated and decoded in the vehicle. Preferably, the data transmission is performed in the infrared spectrum, which means that there is no possibility of a driver of the vehicle being distracted by the light source. Provided that the camera provided in the vehicle for road sign recognition is sensitive enough in the infrared spectrum and the image capture rate is high enough, said camera can be used as a sensor for receiving the data provided by the road sign.

In one variant of the preceding aspect of the method, the light source of the road sign is a matrix light source transmitting data by means of suitable coding of the matrix. Depending on the size of the matrix, larger volumes of data can be transmitted by means of sequential actuation of the matrix to display successive, different patterns. In this variant of the method too, the matrix can emit light in the visible spectrum or in the infrared spectrum. The applicable light-sensitive sensor must in this context at least be capable of capturing the individual elements of the matrix in distinguishable fashion. In this variant of the method too, the camera provided in the vehicle for road sign recognition can be used for this purpose, provided that it is sensitive enough in the light spectrum emitted by the road sign and, if sequentially successive patterns are transmitted, the image capture rate is high enough.

According to one aspect of the method, the data provided by the road sign are obtained by means of a radio receiver. Suitable radio links are, by way of example, variants of the transmission system defined in the IEEE 802.11 standard, said system also being known by the name WLAN or WiFi, but also variants of the transmission system defined in the IEEE 802.15.1 standard, said system being known by the name Bluetooth. Other wireless transmission systems, inter alia using the communication standards known by the name Z-Wave or ZigBee, can likewise be used, provided that the range and data transmission rate and also the time required for connection setup are sufficient. The road sign in this context is equipped with an applicable transmitter, the vehicle is equipped with a suitable receiver.

Instead of or in addition to an explicit identification of the road sign, the content and the installation site, the information obtained from the road sign can contain a hash value for the data relevant to a verification. If only the hash value is provided by the road sign, it can be compared with a hash value applicable for the geographical position of the road sign, which is obtained from a database. The use of hash values can reduce the volume of data to be obtained from the database and to be compared.

In the case of the aspects of the present method that involve a database being accessed, the data may fundamentally be stored in a vehicle-internal or a vehicle-external database for a comparison of the information obtained from the road sign. The database can be accessed using the information obtained from a road sign or using the geographical position of a recognised road sign.

According to one aspect of the method, at least some of the data obtained from the road sign are encrypted beyond a coding. The encryption can be used to hamper manipulation of the data provided by the road sign. Such manipulation would be necessary, for example, in order to make a road sign stolen at one location and installed at another location provide data corresponding to the new installation location.

In one embodiment of this aspect of the method, the content of the data provided by the road sign is used to ascertain a hash value that is likewise part of the additional information provided by the road sign. The hash value is created by an official and trustworthy center, for example, using a secret private key. To check the content of the road sign, the examining unit, for example the vehicle that has recognised the road sign and wishes to check it, needs to know the public key associated with the private key so that the encrypted hash value can be decrypted.

The public key(s) may be stored in an applicable memory or in an applicable database in the vehicle. The public keys stored in the vehicle can, by way of example, be distributed, or updated, to examining units daily at stipulated times, for example when a vehicle is in range of a wireless network, for example when a vehicle is parked in the garage at home in range of the WLAN network of the vehicle keeper. In order to keep down the number of public keys to be transmitted and stored, there may be provision for only keys for a particular region or only keys for a planned route to be loaded. In this case, the region for which the keys are loaded can be dynamically adapted by means of analysis of journeys made in the past and for different users.

The public keys can also be loaded depending on the situation as required, however, for example when a road sign has been recognised. In this case, a key for a particular, just recognised road sign can be loaded, or keys for road signs situated close to the recognised road sign are additionally loaded. As a result, the number of connection setup processes to a database not arranged in the vehicle or to a server can be reduced without making particularly high demands on the size of the memory in the vehicle.

As already mentioned earlier on in regard to one aspect of the method, the data provided by the road sign can comprise a link to a database from which the installation site and the content of the road sign can be retrieved. Expediently, the data provided by the road sign also comprise an explicit identification of the road sign.

According to one aspect of the method, the installation site is determined by matching visually recognisable landmarks situated in the surroundings of the road sign against corresponding images in a database. In this case, the road sign provides an applicable link to a database, which link can be used to obtain one or more images of the surroundings of the road sign from the database. Landmarks are expediently objects or topographical features for which a significant change is not to be expected or occurs only very slowly or rarely, and which are easily recognisable in an image recorded by a camera. Landmarks can also comprise markings permanently made on the road. The camera used for recognising the road sign in the vehicle may in this context be set up such that the recorded image records a sufficiently large area of the surroundings of the road sign that is suitable for a comparison. Alternatively, one or more further cameras whose images are suitable for the comparison may be provided in the vehicle. These cameras may also be provided for capturing the surroundings of the vehicle for an autonomous or semiautonomous or automated driving mode, for example.

According to one aspect of the method according to the invention, the length of a distance between two road signs is used to verify a respective closest road sign. In this case, a road sign recognition system in a vehicle first of all recognises a road sign and verifies it according to one of the above-described aspects of the method, for example. In the course of the verification, the length of the distance to the next road sign or the installation site thereof and the content thereof are transmitted to the vehicle. When the next road sign is recognised, a check is first of all performed to determine whether the distance covered since the last recognised road sign is concordant with the transmitted value or with a value determined from the installation site of said road sign. To determine the length of the distance, the odometer of the vehicle can be used, which concurrently runs continuously anyway. If, in the case of this aspect, road signs are temporarily installed between two permanently installed road signs, they can themselves transmit an applicable piece of information indicating that they are installed only temporarily and are meant to be ignored for this kind of verification.

According to the invention, if the determined data and the obtained data are concordant then the content of the road sign is displayed or announced to a driver of the vehicle for information. Alternatively or additionally, the content of the road sign can be supplied to a system for influencing vehicles. If there is no concordance then a further automatic plausibility check can be performed or a question can be sent to the driver, or an applicable signal can be sent to a vehicle-external database.

According to one aspect of the method, information indicating the particular characteristic of the road sign is extracted from data provided by mobile or temporarily installed road signs. In the case of temporarily installed road signs, this additional information can be used, for example, so that an unsuccessful attempt at accessing a database for verification purposes results in the road sign nevertheless being classified as trustworthy. An unsuccessful attempt at access of this kind can be made, by way of example, when a connection cannot be set up to the database. An unsuccessful attempt at access to a database can alternatively be made when an image of surroundings cannot be obtained for the road sign for comparison purposes, for example because when the road sign was installed it was forgotten to take one or more corresponding images and store them in the database.

In the case of this aspect, a lesser degree of trustworthiness can be assigned than in the case of complete verification after successful access to the database. By way of example, a lesser degree of trustworthiness can influence the extent to which the content of the road sign is taken into consideration for interests concerning autonomous or automated driving and, for example, can result in control of the vehicle being returned to the driver.

In the case of a mobile road sign, the data provided by the road sign can vary over time, for example if the changing position of the road sign is taken into consideration in the data transmitted by the road sign. Since a fixed installation site is normally assumed for a road sign, variable position data over time could be regarded as an error and the road sign could be interpreted as invalid. In the case of a mobile road sign providing an applicable piece of information about its particular characteristic or providing respective current position data, the position data varying over time would not automatically lead to the road sign being interpreted as invalid.

Verification by matching images of the surroundings of the road sign against corresponding images obtained from a database is almost impossible in the case of a mobile road sign. A corresponding database query will almost always fail. In this case too, the failure of an image comparison in the case of a mobile road sign providing an applicable piece of information about its particular characteristic would not automatically result in the road sign being interpreted as invalid. However, in this case too, it is possible for the road sign to be assigned a lesser degree of trustworthiness, leading to applicable action options in a manner similar to the example of temporarily installed road signs described earlier on.

An apparatus for performing the present method comprises at least one camera, at least one microprocessor having main memory and nonvolatile memory and at least one apparatus for determining a present position on the earth's surface. The nonvolatile memory contains computer program instructions that, when executed by the microprocessor in the main memory, perform the method steps of one or more aspects of the present method.

To perform some aspects of the present method, the apparatus furthermore also comprises one or more light-sensitive sensors and/or one or more radio receivers that can be used to receive the data provided by the road sign.

The apparatus for performing the present method does not necessarily need to be implemented in a single device in this case. It is also possible for individual work steps of the method to be carried out in separate devices connected by means of a network for a data transmission, all of the devices connected by means of the network that perform individual work steps of the method together forming the apparatus. Different method steps can take place in parallel and possibly in different connected devices in this case, for example the determination of the installation site and the determination of the content of the road sign.

A road sign that can be verified by means of the present method comprises not only its physical manifestation, that is to say not only its shape and color, which have been combined in a known manner using different materials to produce the object "road sign", but also at least one apparatus for providing data that represent at least the content and the installation site of the road sign, and that are not immediately recognisable or interpretable for a human being. The apparatus for providing data may be set up to provide data in static form as a result of their appearance, for example in the form of a barcode or QR code. The apparatus for providing data may, however, also be set up to provide data as a chronologically successive sequence of signals, for example in the form of modulated light signals or radio signals. In this case, complete capture of the data requires a complete series of signals to be captured over a particular period of time.

It is irrelevant for the road sign whether the data are provided in permanently uninterrupted fashion or whether they are provided only on request and possibly after a protocol for connection setup has been executed.

A system according to the invention comprises at least one road sign verifiable by means of the present method and at least one apparatus, arranged in a vehicle, for performing one or more aspects of the present method.

The method and the apparatus are advantageously suitable for rendering autonomously or automatically driving vehicles, which are reliant on trustworthy information from their surroundings, capable of verifying the validity of road signs recognised by means of known optical means additionally. In this context, the content of the road sign and the installation site can be verified, inter alia. Verification provides the autonomously or automatically driving system but also a human driver with the certainty of being able to rely on the depicted or recognised sign. In this case, the absence of certification or a failed verification does not necessarily have to indicate a manipulation. The absence of certification or verification can, however, influence the reaction of an autonomously or automatically driving vehicle to a recognised road sign. By way of example, the autonomous or automated vehicle can itself decide whether it believes the unverified sign if the content thereof is inconsistent with the current driving situation to an excessive degree, e.g. if a road sign indicating a speed limit of 30 km/h has been recognised when travelling on a freeway. It is also conceivable for further sensors, which are otherwise inactive, to be switched on for a road sign not verified according to the present method, or for stipulations pertaining to acceleration, strength of braking processes, safety distances and the like to be set to values that entail a greater safety margin.

BRIEF DESCRIPTION OF THE DRAWINGS

Aspects of the invention will be described below with reference to the drawing. In the drawing:

FIG. 7a shows an example of a road sign that has obtained a new content in the same category as a result of manipulation;

FIG. 7b shows an example of a road sign that has obtained a new content in a different category as a result of manipulation;

FIG. 8 shows a further exemplary flowchart of an aspect of the method according to the invention;

DETAILED DESCRIPTION

Figure 1:
FIG. 1 shows a first example of a road sign used in an unusual way.

In the figures of the drawing, identical or similar elements are provided with identical reference signs.

Figure 2:
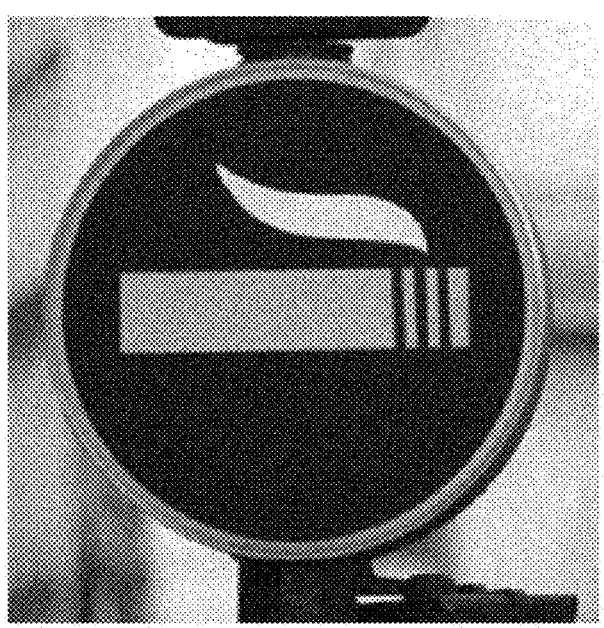
FIG. 2 shows a second example of a road sign used in an unusual way.

FIGS. 1 and 2 show road signs used in an unusual way, in this case the prohibition of entry onto a street or road permitted only for oncoming traffic. The meaning of the road sign is still recognisable for a human being, but a camera-based road sign recognition system cannot recognise the content with certainty.

Figure 3:
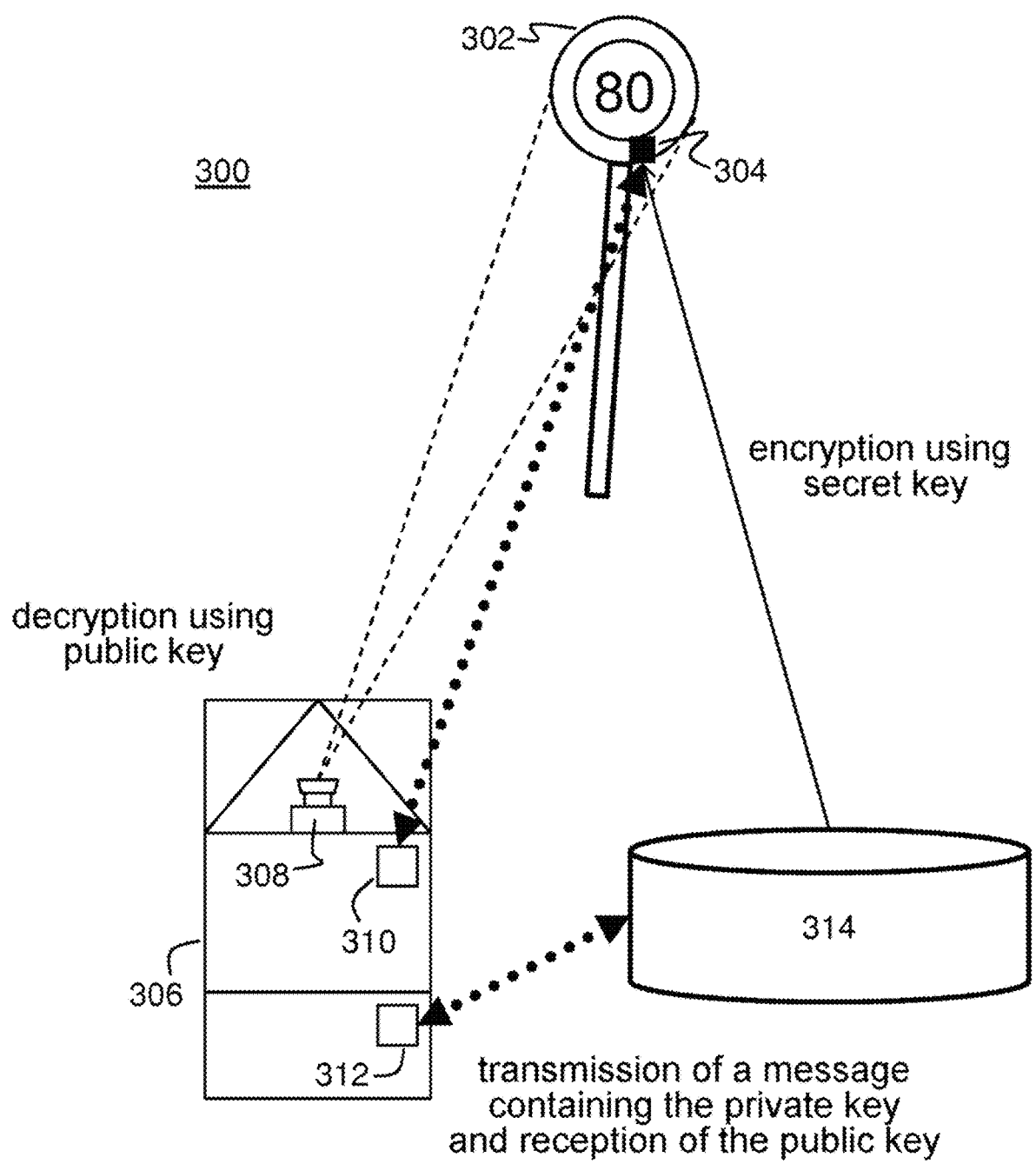
FIG. 3 shows an exemplary schematic overview of a system for performing an aspect of the method according to the invention.

FIG. 3 shows an exemplary depiction of a system 300 for performing an aspect of the method according to the invention. A road sign 302 is equipped with an apparatus 304 for transmitting additional metainformation, e.g. a QR code, or with a transmitter for wirelessly transmitting the metainformation via a radio connection. A vehicle 306 approaching the road sign 302 is equipped with an apparatus 308 for optical road sign recognition, depicted by the stylised camera. The road sign 302 is situated within the capture area of the apparatus 388, as indicated by the dashed lines coming from the camera, and is recognised in a known manner. A receiver 310 arranged in or on the vehicle 306 receives additional metainformation from the apparatus 304 of the road sign 302. Reception can require prior connection setup, for example when the metainformation is transmitted via a radio connection. The transmission of the metainformation is indicated by the dotted double-headed arrow between the apparatus 304 and the receiver 310. The metainformation permits the semantic content of the road sign recognised by the apparatus 308 and the installation site of said road sign to be checked. The check can be performed, by way of example, by means of an apparatus 312, arranged in or on the vehicle 306, that accesses a database 314. As such, the metainformation transmitted by the apparatus 304 is encrypted using a private key, for example, in order to prevent or at least hamper manipulation of the metainformation, and can be decrypted only using a corresponding public key. The private key may have been generated and stored in the database 314, for example, and transmitted to the apparatus 304. The receiver 310 receives the metainformation encrypted using the private key from the apparatus 304 arranged on the road sign 302. The apparatus 312 transmits a message containing the private key to the database 314 and, in response to the message, receives a message containing a public key matching the private key from the database 314. The private and public keys now available in the vehicle 306 can be used to decrypt the metadata received from the road sign 302, and the content of the road sign as recognised by the apparatus 308 can be compared with the metainformation.

Figure 4:
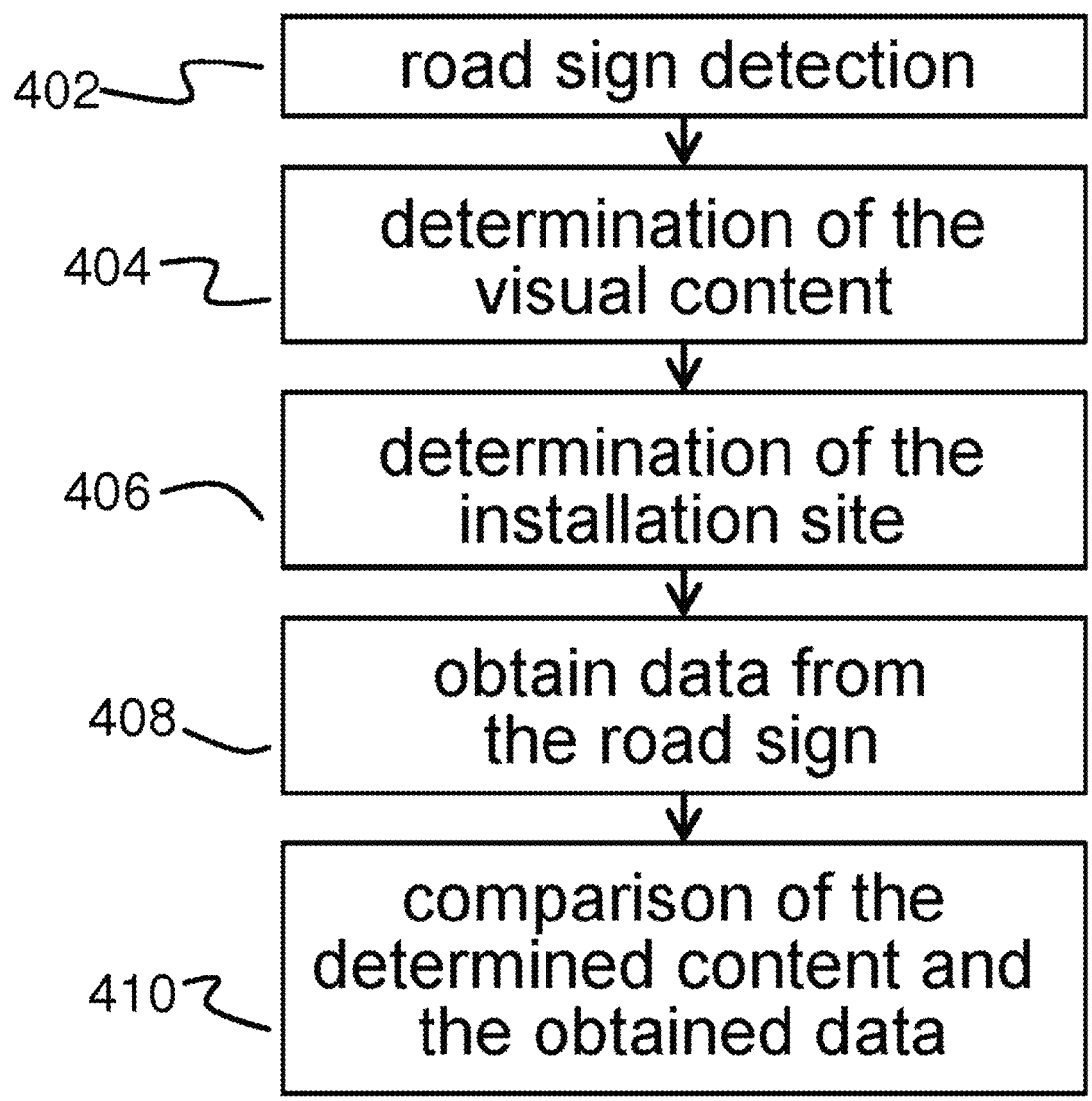
FIG. 4 shows a highly simplified flowchart of an aspect of the method according to the invention.

FIG. 4 shows a highly simplified flowchart of an aspect of the method according to the invention. In step 402, road sign recognition is performed in previously recorded images from a camera. When a road sign has been recognised, the content of the recognised road sign that is visually recognisable for a human observer is determined in step 404, and the installation site is determined in step 406, for example using a navigation apparatus. In step 408, data for the recognised road sign are obtained from the road sign, with further information concerning the road sign either being able to be extracted from said data immediately or said data allowing further such information to be obtained, for example by accessing a database. Finally, in step 410, the visually determined content is compared with the further information. Depending on the result of the comparison, the road sign is classified as validated or not validated (not shown in the figure).

Figure 5:
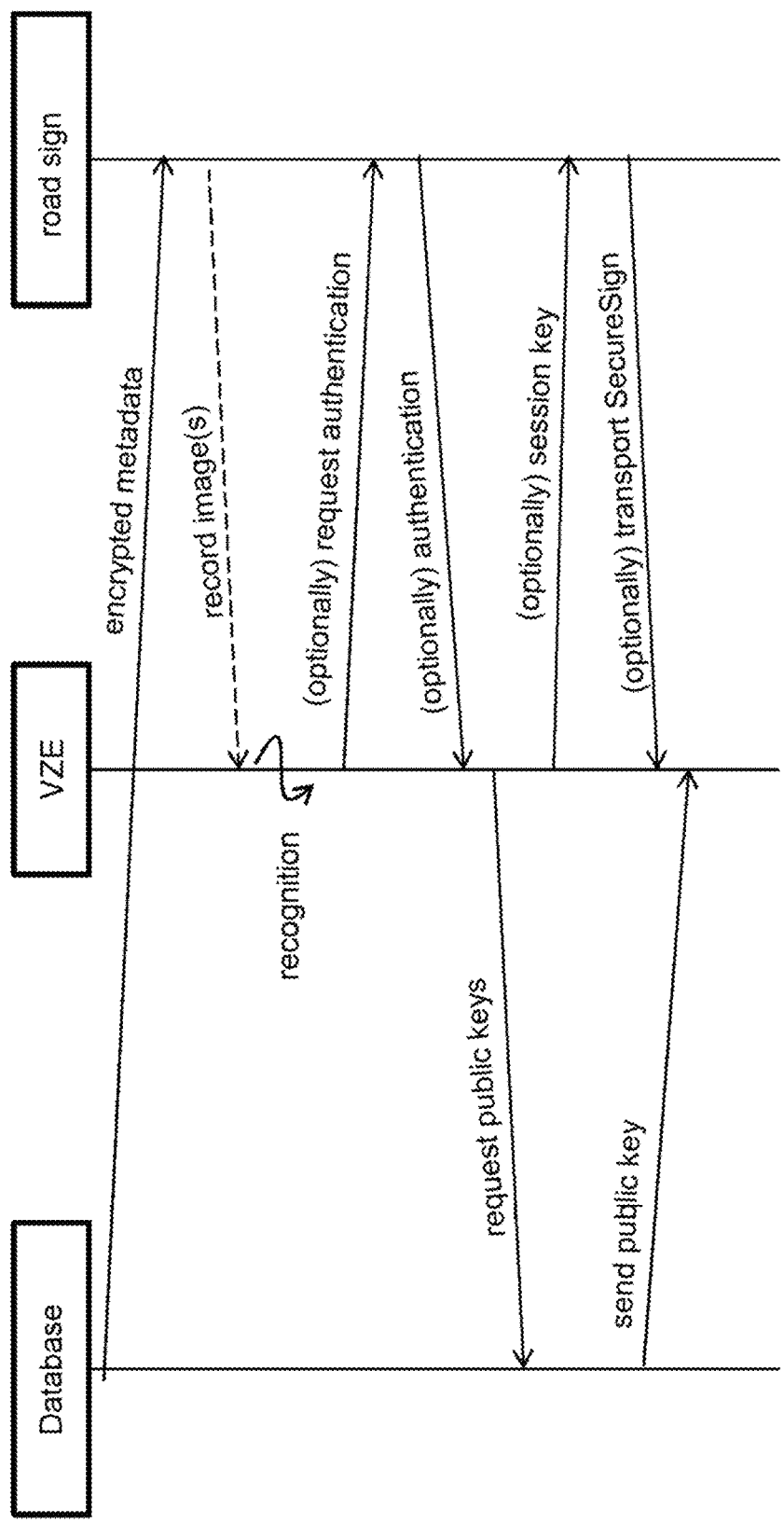
FIG. 5 shows an exemplary method sequence of an aspect of the method according to the invention.

FIG. 5 shows an exemplary method sequence of an aspect of the method according to the invention on the basis of an exchange of messages between the agents involved in the method. The chronology in this case runs from top to bottom in the figure. It should be noted that not all messages absolutely have to be sent on every pass of the method. As such, it is sufficient to send the message from the database to the road sign only once, for example. If the metadata encrypted using the private key are stored in the transmission apparatus of the road sign, a fresh transmission is only necessary again should the metadata have changed. At the beginning of or before performance of the method, the metadata encrypted using the private key are thus first of all sent from the database to the road sign. A camera of an apparatus (VZE) for road sign recognition records one or more images of the road sign and supplies them to a process for road sign recognition. For the sake of simplicity, the apparatus for road sign recognition (VZE) used in the figure comprises all the necessary components for communication with the road sign and the database. When the one or more images are recorded by the camera, an exchange of messages from the road sign to the camera takes place to some extent, which differs from the exchange of messages in the other steps of the method, however. Thus, this step is depicted using a dashed line. The apparatus (VZE) for road sign recognition performs road sign recognition for the one or more images from the camera and extracts the metadata from the image(s) from the camera. Optionally, the apparatus (VZE) for road sign recognition sends a request for authentication to the road sign, which sends a corresponding response. After the road sign has possibly been authenticated to the apparatus (VZE) for road sign recognition, the apparatus (VZE) for road sign recognition sends a request to the database in order to receive the public key of the road sign. The public key received from the database in response to the request can be used by the apparatus (VZE) for road sign recognition to decrypt the metainformation, encrypted using the private key, extracted from the image(s) from the camera.

Optionally, a session key can be negotiated between the apparatus (VZE) for road sign recognition and the road sign, for example to secure reception of the public key from the database.

Figure 6:
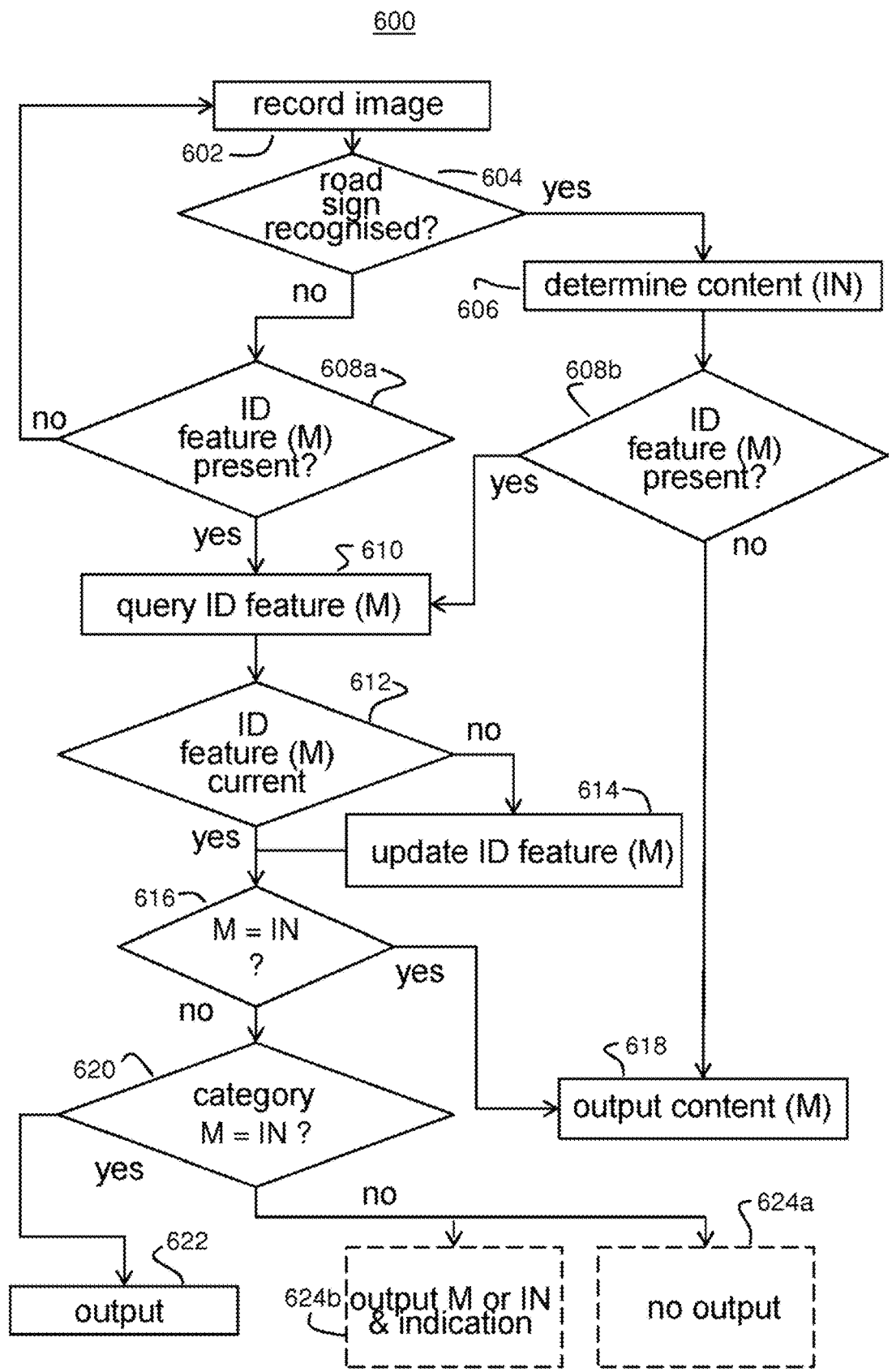
FIG. 6 shows an exemplary flowchart of an aspect of the method according to the invention.

FIG. 6 shows an exemplary flowchart of an aspect of the method 600 according to the invention. In step 602, an image is first of all recorded that is subjected to road sign recognition (not shown in the figure). In the course of the road sign recognition, a database query can be performed, for example in order to obtain reference images of valid road signs for a comparison (not shown in the figure). If no road sign has been recognised, "no" branch from step 604, a check is performed in step 608a to determine whether an identification feature (M) is present in the image from the camera or has been found to be present in another way, that is to say a feature that can be used to obtain additional data concerning the road sign. If no identification feature has been recognised, "no" branch from step 608a, the method is applied to further images recorded at a time after the image examined in this pass of the method. If a road sign has been recognised in step 604, "yes" branch from step 604, the content (IN) of the road sign is determined in step 606 and a check is performed in step 608b, analogously to step 608a, to determine whether an identification feature (M) has been recognised. If no identification feature (M) has been recognised, "no" branch from step 608b, the content (IN) of the road sign is output, optionally with an additional indication that, by way of example, the content and installation site of the road sign have not been able to be verified by means of an identification feature. If an identification feature has been recognised in either of steps 608a and 608b, respective "yes" branches of the steps, additional data relating to the road sign are obtained in step 610, for example by means of a database query, or by means of direct decoding of an image area representing the feature. In step 612, a check is then performed to determine whether the data relating to the road sign are current and valid. This step can also comprise a database query (not shown in the figure). If the data are not current, "no" branch from step 612, they are replaced with current data in the course of the check in step 614. The current or updated data are compared in step 616 with the content of the road sign determined in step 606. If there is concordance, "yes" branch from step 616, step 618 involves output of the content or optionally the data, there being no difference in this case. If there is no concordance, "no" branch from step 616, a check is performed in step 620 to determine whether the road sign whose content has been determined in step 606 is one in the same category as indicated by the data obtained for the identification feature. The category is identical, by way of example, if, as shown in FIG. 7a, both road signs indicate a speed limit (road sign 274 of the German traffic regulations) but indicate different maximum speeds. In the example shown in the figure, there could be a manipulation in which the number 30 has been "converted" into an 80, this being possible with little effort. The categories are different if, by way of example, the recognised road sign indicates a ban on vehicles of all kinds (road sign 250 of the German traffic regulations), but the data obtained for the identification feature indicate that the road sign indicates a speed limit, as shown in FIG. 7b. In this case, there could be a manipulation as a result of the number 60 being painted over in the background color white. If the category is identical, "yes" branch from step 620, then instead of the content IN determined in step 606, the content M ascertained from the data obtained for the identification feature is output in step 622. If the categories are different, "no" branch from step 620, there is no output, step 624a.

Alternatively, in step 624b, either the content IN ascertained in step 606 or the queried or updated content M is output, with the addition of an indication of the failed validation. The failed validation can optionally also be reported to the database, so that suitable measures for correcting an error that has possibly occurred can be taken.

The output can be provided for a controller of the vehicle, for example, which performs control functions in connection with an autonomous or automated driving mode of the vehicle. The output can alternatively or additionally also be provided visually on a display in the field of vision of the driver, or audibly by means of an appropriate voice output. The additional output may be useful for a decision regarding whether the vehicle should be controlled manually, for example.

FIG. 8 shows a further exemplary flowchart of an aspect of the method 800 according to the invention. In step 802, a camera (not shown) arranged in a vehicle records an image, and in step 804 an identification feature of a road sign in the image is recognised. A query is sent for the recognised identification feature to a backend 801, step 806, in order to obtain data pertaining to the road sign provided with the identification feature. By way of example, the data comprise details pertaining to the installation site and content, but also pertaining to a permanent or temporary validity of the road sign. In step 808, a GPS position of the vehicle, associated with the previously recorded image, is queried by an applicable apparatus (not shown) arranged in the vehicle. If the queried position is concordant with the position obtained from the backend, the position is confirmed to the backend in step 810. In step 812, the content of the road sign is recognised, for example by means of an apparatus or piece of software for image recognition (not shown). If the recognised content of the road sign is concordant with the obtained content, the content is confirmed to the backend in step 814. In step 816, a check is performed to determine whether the image analysis has provided details pertaining to the validity of the road sign, that is to say whether the road sign is already or still valid on the present day and at the present time of day. Such a detail can be provided, by way of example, by means of additional signs mounted on the road sign that indicate a beginning and an end of validity and that can be evaluated by image recognition and optical character recognition (OCR). If details pertaining to validity have been recognised and they are concordant with the details obtained from the backend, an applicable confirmation is sent to the backend in step 818. If no details concerning validity have been recognised, but the road sign is still valid on the present day and at the present time, then a confirmation can be sent to the backend in step 818 indicating that the road sign is still installed at the envisaged position. Equally, if no details concerning validity have been recognised, and the road sign should no longer be installed at the location on the present day and at the present time, then an applicable report can be sent to the backend in step 818 indicating that the road sign is still installed at the envisaged position.

Individual steps of the exemplary method shown in FIG. 8 can be processed in a different order or in parallel.

Figure 9:
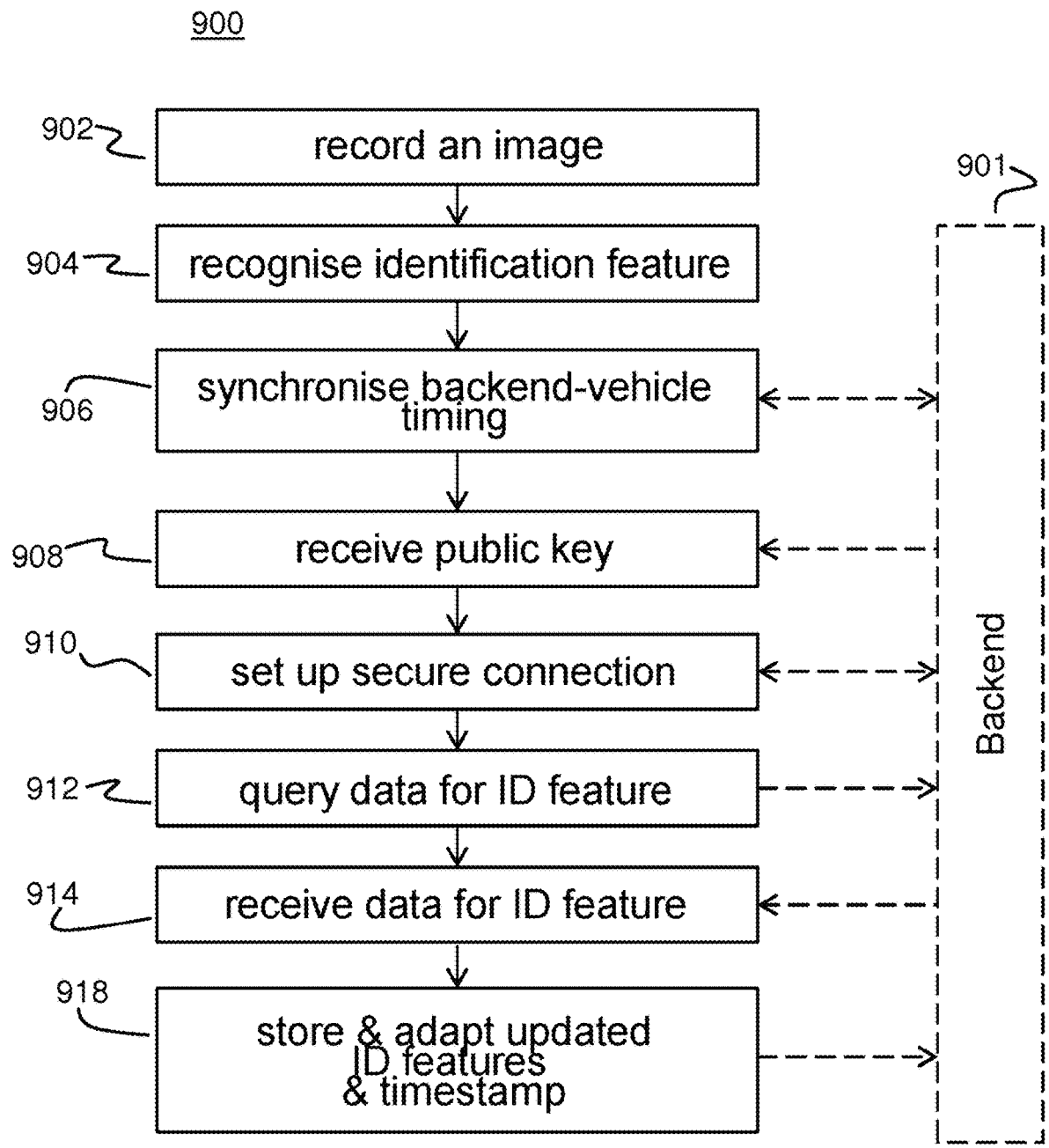
FIG. 9 shows a further schematic example of an aspect of the method according to the invention.

FIG. 9 shows a further schematic example of an aspect of the method 900 according to the invention. As in FIG. 8, in step 902, a camera (not shown) arranged in a vehicle first of all records an image, and in step 904 an identification feature of a road sign in the image is recognised. In step 906, timing synchronisation is performed between vehicle and backend or database, with information from the identification feature being able to be used for connection setup for this purpose.

The timing synchronisation can alternatively or additionally also be performed using other channels, e.g. using a signal received from a satellite navigation system, connection setup not being necessary for this purpose in this case. In step 908, a public key for the road sign is obtained from the backend or database, following setup of an applicable connection. In this regard, parts of the identification feature may be unencrypted in order to be able to make an applicable, explicit request to the database. However, it is also possible for the request to be made with the geoposition as a feature, and for a key associated with this geoposition to be received. In step 910, a secure connection is set up between the vehicle and the backend. In step 912, the request to transmit the data stored for the road sign to the vehicle is then made to the backend, said data accordingly being received in step 914. By way of example, the data comprise details pertaining to the installation site and content, but also pertaining to a permanent or temporary validity of the road sign. The installation site provided by the database can also comprise a map detail with additional geodata, which are used for verification. At least parts of the identification feature may be encrypted in order to hamper manipulations, e.g. using a private key from a key pair. This encrypted part can be decrypted using the public key received in step 908, in order to allow a comparison of the data obtained from the backend and the data transmitted by the identification feature. If the private key does not match the received public key, that is to say that the encrypted information cannot be decrypted, then it can be assumed with very high probability that there is a manipulation. If the data obtained from the database and the content ascertained by means of road sign recognition are concordant, then in step 918 an applicable report is sent to the backend indicating that the road sign has been recognised and validated at the present geoposition at the present time.

As in FIG. 8, individual steps of the exemplary method shown in FIG. 9 can be processed in a different order or in parallel.

Figure 10:
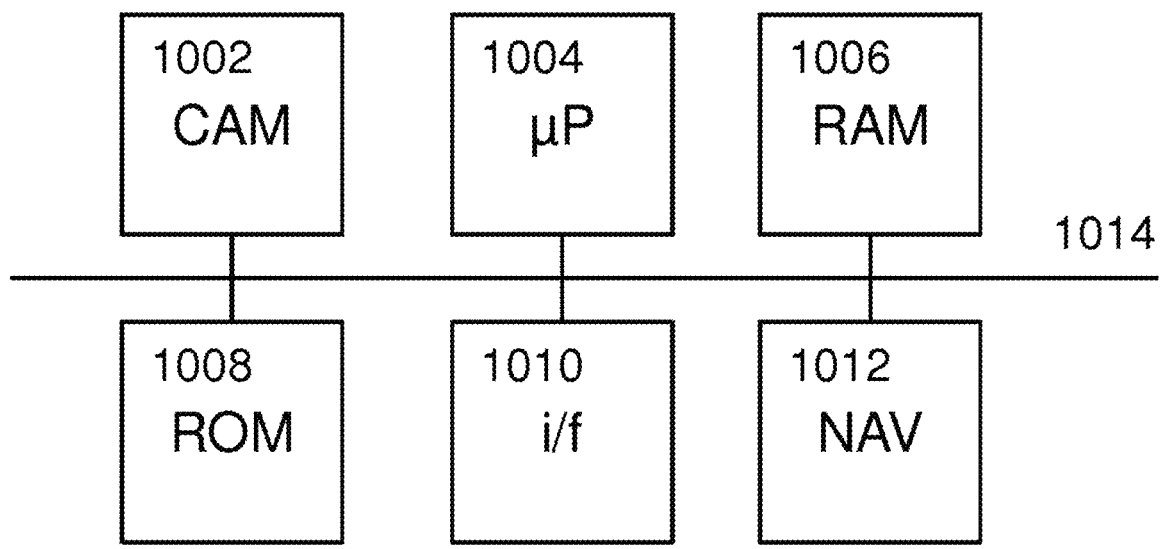
FIG. 10 shows a simplified exemplary block diagram of a vehicle-based apparatus for performing the method according to the invention.

FIG. 10 shows a simplified exemplary block diagram of a vehicle-based apparatus 1000 for performing the method according to the invention. A camera 1002 is indirectly or directly communicatively connected via one or more data buses 1014 to a microprocessor 1004, a main memory 1006, a nonvolatile memory 1008, an interface 1010 for outputting a result of the verification and an apparatus 1012 for determining a position of a vehicle. The nonvolatile memory 1008 contains computer program instructions that, when executed by the microprocessor 1004 in conjunction with the main memory 1006 and possibly with access to further system components, carry out one or more aspects of the method according to the invention.

The invention claimed is:

1. A method for verifying the semantic content and installation site of road signs, comprising:
    detection of a road sign in images from at least one camera,
    determination of the semantic content of the road sign that is visually recognizable for a human being by analysis of at least one image from the camera,
    characterized in that the method moreover comprises:
    determination of the installation site of the road sign by means of a navigation apparatus of a vehicle carrying out the method and by matching visually recognizable landmarks situated in the surroundings of the recognized road sign against corresponding images in a database, obtaining, via the at least one camera or a wireless data-communication link, data provided by the road sign that represent at least the semantic content and the installation site of the road sign and that are not immediately visually recognizable or interpretable for a human being, wherein the data provided by the road sign are obtained by means of at least one camera, at least one light-sensitive sensor or at least one radio receiver, comparison of the determined data and the obtained data, and wherein, when the determined data and the obtained data are concordant, the semantic content of the road sign is displayed or announced to a driver of a vehicle for information, or supplied to a system for influencing vehicles, and, when there is no concordance, a further automatic plausibility check is performed or a question is sent to the driver.

2. The method as claimed in claim 1, wherein the data obtained from the road sign are coded and/or encrypted.

3. The method as claimed in claim 1, wherein the data obtained from the road sign and representing the semantic content and the installation site of the road sign comprise a reference to a database that provides the installation site and the semantic content of the road sign in retrievable fashion.

4. The method as claimed in claim 1, wherein information indicating the particular characteristic of the road sign is extracted from data provided by mobile or temporarily installed road signs.

5. The method as claimed in claim 1, wherein information comprising a current location of the road sign is extracted from data provided by mobile or temporarily installed road signs.

6. The method as claimed in claim 5, wherein the data provided by the road sign are obtained by capturing a time-variable QR code.

7. The method as claimed in claim 1, wherein the at least one camera is used for both capturing the images used in detection of a road sign and for obtaining the data provided by the road sign that represent at least the semantic content and the installation site of the road sign and that are not immediately visually recognizable or interpretable for a human being.

8. The method as claimed in claim 1, wherein a light source of the road sign is a matrix light source transmitting data by means of suitable coding of the matrix.

* * * * *